(12) United States Patent
Bernhardt

(10) Patent No.: US 9,961,891 B2
(45) Date of Patent: May 8, 2018

(54) APPARATUS FOR CAPTURING FRUIT FLIES

(71) Applicant: Michael D. Bernhardt, Buffalo, NY (US)

(72) Inventor: Michael D. Bernhardt, Buffalo, NY (US)

( * ) Notice: Subject to any disclaimer, the term of this patent is extended or adjusted under 35 U.S.C. 154(b) by 0 days. days.

(21) Appl. No.: 15/196,809

(22) Filed: Jun. 29, 2016

(65) Prior Publication Data

US 2016/0366871 A1 Dec. 22, 2016

Related U.S. Application Data

(63) Continuation-in-part of application No. 14/573,110, filed on Dec. 17, 2014, now Pat. No. 9,504,241, and a continuation-in-part of application No. 13/971,202, filed on Aug. 20, 2013.

(60) Provisional application No. 62/208,983, filed on Aug. 24, 2015, provisional application No. 61/918,028, filed on Dec. 19, 2013.

(51) Int. Cl.
| | |
|---|---|
| *A01M 1/10* | (2006.01) |
| *A01M 1/02* | (2006.01) |
| *A01M 1/12* | (2006.01) |
| *A01M 1/06* | (2006.01) |

(52) U.S. Cl.
CPC .............. *A01M 1/106* (2013.01); *A01M 1/02* (2013.01); *A01M 1/06* (2013.01); *A01M 1/10* (2013.01); *A01M 1/12* (2013.01)

(58) Field of Classification Search
CPC .......... A01M 1/00; A01M 1/10; A01M 1/106; A01M 1/22

USPC ........................ 43/107, 111, 122, 124, 132.1
See application file for complete search history.

(56) References Cited

U.S. PATENT DOCUMENTS

| | | | |
|---|---|---|---|
| 993,644 A | 5/1911 | Brisbane | |
| 4,086,720 A * | 5/1978 | Wiser ...................... | A01M 1/04 |
| | | | 362/802 |
| 4,332,100 A | 6/1982 | Schneider | |
| 4,625,453 A | 12/1986 | Smith | |
| 4,678,485 A | 7/1987 | Finley et al. | |
| 5,040,326 A | 8/1991 | Van Dijnsen et al. | |
| 5,116,219 A | 5/1992 | Zimmerman | |

(Continued)

OTHER PUBLICATIONS

Notice of Allowance and Fee(s) Due for U.S. Appl. No. 14/573,110; entitled "Apparatus for Capturing Fruit Flies", dated Jun. 3, 2016.

*Primary Examiner* — David J Parsley
(74) *Attorney, Agent, or Firm* — Hamilton, Brook, Smith & Reynolds, P.C.

(57) ABSTRACT

Fly traps that do not require toxic chemicals and that can un-intrusively be present in public areas. An example trap includes a housing to contain a solution and including opening(s) for ingress of flies, a conduit or nozzle, a pump to cause solution to flow via the conduit/nozzle and along the inner surface of the housing to capture flies, and a timer to activate the pump. Another example trap includes a gathering vessel, conduit coupled to the vessel and to be submerged in a fluid trap, a vacuum to remove air from the fluid trap, and a timing device to activate the vacuum. Another example trap includes an outer wall to contain a solution, an inner wall extending into the solution, an air pump and conduit(s) to form bubbles in the solution that rise in a space between the outer and inner walls and cascade down the inner wall.

20 Claims, 16 Drawing Sheets

(56) References Cited

U.S. PATENT DOCUMENTS

| | | | |
|---|---|---|---|
| 5,222,322 | A | 1/1993 | Mastromonaco |
| 5,241,779 | A | 9/1993 | Lee |
| 5,289,612 | A | 3/1994 | Glenn, III |
| 5,311,697 | A * | 5/1994 | Cavanaugh ............. A01M 1/08 43/107 |
| 5,915,950 | A | 6/1999 | Kleinhenz |
| 5,926,997 | A | 7/1999 | Wilcox |
| 6,189,259 | B1 * | 2/2001 | Soller ................. A01M 1/2005 43/131 |
| 6,209,256 | B1 | 4/2001 | Brittin et al. |
| 6,508,032 | B2 * | 1/2003 | Lin ...................... A01M 1/023 43/107 |
| 6,568,125 | B2 | 5/2003 | Kleinhenz |
| 6,655,080 | B2 | 12/2003 | Spiro et al. |
| 7,805,882 | B2 | 10/2010 | Wolf |
| 8,109,036 | B1 | 2/2012 | Wilbanks |
| 2004/0025412 | A1 | 2/2004 | Simchoni et al. |
| 2005/0102888 | A1 * | 5/2005 | Curnow ................. A01M 1/04 43/113 |
| 2011/0056118 | A1 | 3/2011 | Miller et al. |
| 2011/0283597 | A1 | 11/2011 | Coventry |
| 2012/0066958 | A1 | 3/2012 | McGinnis, Jr. |
| 2015/0052799 | A1 | 2/2015 | Bernhardt |
| 2015/0173340 | A1 | 6/2015 | Bernhardt |
| 2015/0289497 | A1 | 10/2015 | Bennett |
| 2016/0021864 | A1 | 1/2016 | Koo et al. |

* cited by examiner

APPARATUS FOR CAPTURING FRUIT FLIES

RELATED APPLICATIONS

This application: (1) is a continuation-in-part of U.S. application Ser. No. 13/971,202, filed Aug. 20, 2013, (2) is a continuation-in-part of U.S. application Ser. No. 14/573,110, filed Dec. 17, 2014, which claims the benefit of U.S. Provisional Application No. 61/918,028, filed Dec. 19, 2013, and (3) claims the benefit of U.S. Provisional Application No. 62/208,983, filed Aug. 24, 2015. The entire teachings of the above applications are incorporated herein by reference.

BACKGROUND

Fruit flies contaminate food, wreak havoc on the liquor stores of bars and restaurants, and destroy crops; costing money in wasted product and lost produce. Conventional methods for attempting to remove these pests often employ toxic chemicals and physical traps, such as, for example, dangling adhesive tapes. While these methods may successfully remove some flies from a local environment, they also have downsides. In a business environment, especially for a food service, a dangling tape of dead flies is neither sanitary nor something that should be observed by the clientele. In the case of chemical traps, toxic chemicals pose health risks if not handled or disposed properly.

SUMMARY OF THE INVENTION

Disclosed herein are traps for flies (e.g., fruit flies) that do not require the use of toxic chemicals and are capable of being packaged in such a way that they can be present in public areas without being unsightly or intrusive. Unlike traditional traps and tapes, the disclosed traps isolate the captured flies in a container, separating them from the outside environment, and unlike traditional trap systems, which generally must be disposed and replaced, the disclosed traps are reusable, easy to set up, easy to clean, and easy to operate.

One example fly trap includes a lower trap portion configured to contain a solution, an upper trap portion containing ambient air and that includes at least one opening to allow for ingress of flies, a conduit extending from the lower trap portion to the upper trap portion, a pump configured to be submersed in the solution and coupled to the conduit, and a timer for intermittently activating the pump. When activated, the pump causes solution to travel up the conduit and to flow along the inner surface of the upper trap portion. Any flies that have landed on the inner surface of the upper trap portion are captured by the flowing solution.

Another example fly trap includes a housing configured to contain a solution and including at least one opening to allow for ingress of flies, a conduit arranged substantially vertically in the housing, a pump configured to be submersed in the solution and coupled to the conduit, and a timer for intermittently activating the pump. When activated, the pump causes the solution to travel up the conduit and to flow along the inner surface of the housing, capturing any flies that have landed on the inner surface.

Another example fly trap includes a housing configured to contain a solution and including at least one opening to allow for ingress of flies, a nozzle located inside the housing and configured to spray the solution toward the top of the trap, a pump configured to be submersed in the solution and coupled to the nozzle, and a timer for intermittently activating the pump. When activated, the pump causes the solution to spray from the nozzle toward the top of the trap and to flow along the inner surface of housing, capturing any flies that have landed on the inner surface.

Some of the above example traps may also include shield(s) coupled to the inner side of the opening(s) to prevent the solution from exiting the trap. The trap may also include a tray to be suspended above the solution for retaining fly bait, or may include a screen to be submersed in the solution and above the pump for retaining captured flies above the screen. The upper and lower trap portions may be separate pieces that can be coupled together, or can be part of one component. The opening may be created by a space between the upper and lower trap portions. The timer may be internal or external to the trap.

Another example embodiment of the present invention is a fly trap that includes a gathering vessel, fluid trap, conduit, vacuum, and timing device. The gathering vessel includes a container to hold fly-attracting bait. The gathering vessel also includes a first opening allowing the flies to enter the gathering vessel and a second opening allowing for collection of the flies. The fluid trap is able to be partially filled with fluid. The conduit has a first end coupled to the second opening of the gathering vessel and a second end to be submerged within fluid inside the fluid trap. The vacuum is coupled to the fluid trap and removes air from the fluid trap to cause air and flies to flow from the gathering vessel, through the conduit, and into fluid inside the fluid trap. The timing device is electronically coupled to the vacuum and periodically activates and deactivates the vacuum.

In some embodiments, the container is suspended inside the gathering vessel, and the gathering vessel may include a platform near the container for the flies to land. The interior of the gathering vessel can include a low-friction surface (e.g., coated with polytetrafluoroethylene) to reduce the flies' ability to stay in the gathering vessel when the vacuum is activated. In many embodiments, the timing device is configured to activate the vacuum for a first amount of time and deactivate the vacuum for a second amount of time, where the second amount of time is longer than the first amount of time. The vacuum may also include baffles to reduce noise emitted from the vacuum Another example embodiment of the present invention is a fly trap that includes a housing, gathering vessel, fluid trap, conduit, vacuum, and timing device. The gathering vessel is coupled to the housing and includes a container to hold fly-attracting bait. The gathering vessel also includes a first opening allowing the flies to enter the gathering vessel and a second opening allowing for collection of the flies. The fluid trap is located inside the housing and is able to be partially filled with fluid. The conduit has a first end coupled to the second opening of the gathering vessel and a second end to be submerged within fluid inside the fluid trap. The vacuum is located inside the housing, is coupled to the fluid trap, and removes air from the fluid trap to cause air and flies to flow from the gathering vessel, through the conduit, and into fluid inside the fluid trap. The timing device is located inside the housing, is electronically coupled to the vacuum, and periodically activates and deactivates the vacuum.

In some embodiments, the gathering vessel is attached to the outside of the housing, and in others, the gathering vessel is located inside the housing, where the first opening of the gathering vessel is an opening in the housing. In many embodiments, the fluid trap is able to be removed from the housing.

Another example embodiment of the present invention is a fly trap that includes a central fluid trap, multiple gathering vessels, multiple conduits, a vacuum, and a timing device. The central fluid trap is able to be partially filled with fluid. The multiple gathering vessels each include a container to hold fly-attracting bait, a first opening allowing the flies to enter the gathering vessel, and a second opening allowing for collection of the flies. The multiple conduits each have a first end coupled to the second opening of a corresponding gathering vessel, and a second end coupled to a common conduit to be submerged within fluid inside the central fluid trap. The vacuum is coupled to the fluid trap and removes air from the fluid trap to cause air and flies to flow from the gathering vessels, through the conduits, and into fluid inside the central fluid trap. The timing device is electronically coupled to the vacuum and periodically activates and deactivates the vacuum.

In many embodiments, the multiple gathering vessels are located at locations remote from the central fluid trap. In some embodiments, a hub may be used to couple the multiple conduits to the common conduit, and the hub can include a switch that activates and deactivates various conduits. The switch may also cycle through the multiple conduits, activating a subset of the conduits at a given time.

Another example embodiment of the present invention is a fly trap that includes multiple gathering vessels, multiple fluid traps, multiple collection conduits, a central vacuum, and a timing device. The multiple gathering vessels each include a container for fly-attracting bait, a first opening allowing the flies to enter the gathering vessel, and a second opening allowing for collection of the flies. The multiple fluid traps each are able to be partially filled with fluid. The multiple collection conduits each have a first end coupled to the second opening of a corresponding gathering vessel, and a second end to be submerged within fluid inside a corresponding fluid trap. The central vacuum is coupled to the fluid traps and removes air from the fluid traps to cause air and flies to flow from the gathering vessels, through the collection conduits, and into fluid inside the fluid traps. The timing device is electronically coupled to the vacuum and periodically activates and deactivates the vacuum.

In many embodiments, the multiple gathering vessels and fluid traps are located at locations remote from the central vacuum. In some embodiments, a hub may be used to couple the multiple fluid traps to the central vacuum, where the hub is coupled to the multiple fluid traps by multiple vacuum conduits, and is coupled to the vacuum by a common conduit. The hub can include a switch that activates and deactivates various conduits, and that can cycle through the multiple vacuum conduits, activating a subset of the vacuum conduits at a given time.

Another example fly trap includes an outer wall containing a solution, an inner wall extending into the solution, and a space formed between the outer wall and the inner wall. The trap also includes an air pump and one or more air supply conduits that supply air from the air pump to the solution. The air forms bubbles in the solution that rise in the space formed between the outer wall and the inner wall and that cascade downward within the inner wall and into the solution.

Some example traps may also include one or more air stones to aide in forming the bubbles. The air stones are coupled to the ends of the one or more air supply conduits and are located within the solution. Other example traps may include a plate with multiple holes to aide in forming the bubbles. The plate is located within the solution and above the ends of the one or more air supply conduits, and can include a hole through which the lower end of the inner wall can extend to allow captured flies to be deposited in the solution. Other example traps may include an air passage with multiple holes to aide in forming the bubbles. The air passage is coupled to an end of the one or more air supply conduits and runs around the perimeter of the outer wall in the space formed between the outer wall and the inner wall.

Some example traps can include a screen located in the solution above the lower end of the inner wall and below the ends of the one or more air supply conduits. The screen retains captured flies below the screen, and can include a hole through which the lower end of the inner wall extends to allow the captured flies to be deposited below the screen. Other example traps can include a mesh layer located at the bottom of the solution that can retain any captured flies.

In many embodiments, the outer wall extends above the inner wall and is angled toward the inner wall to direct bubbles rising in the space formed between the outer wall and the inner wall toward the inner wall. Further, many embodiments can include outer and inner walls that are cylindrically shaped, but the fly traps contemplated herein are not limited to such a shape.

Another example fly trap includes a container with a solution therein, a wall at one end of the container, and an angled surface located within the container and extending into the solution. A space is formed between the wall and the angled surface. The example fly trap also includes an air pump and one or more air supply conduits that supply air from the air pump to the solution. The air forms bubbles in the solution that rise in the space formed between the wall and the angled surface and that cascade downward along the angled surface and into the solution.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

According to the embodiments illustrated in FIGS. 1-6, the body of a trap can create a collection vessel. A pump on an intermittent timer pumps bait fluid up a conduit (e.g., riser pipe) or through a nozzle where the fluid then hits the ceiling of the collection vessel, following the ceiling and edges, and runs back down into the reservoir created by the bottom of the collection vessel to be pumped through the conduit/nozzle again. The traps operate by intermittently projecting the fluid towards the top of the trap and down the trap's inside wall. Fruit flies present in the trap tend to instinctively land on the trap's inner wall surface when startled by the pump and projecting solution, only to be captured by the solution as it flows down the wall. When the pump is started, the fruit flies are rinsed off the wall into the reservoir, and any of the flies that take off when startled fly into the bait fluid covering the ceiling and walls and are washed into the reservoir. In addition, flies that are not on the inside of the trap's upper portion tend to fly up into the stream of fluid when startled by the pump.

Figure 1:
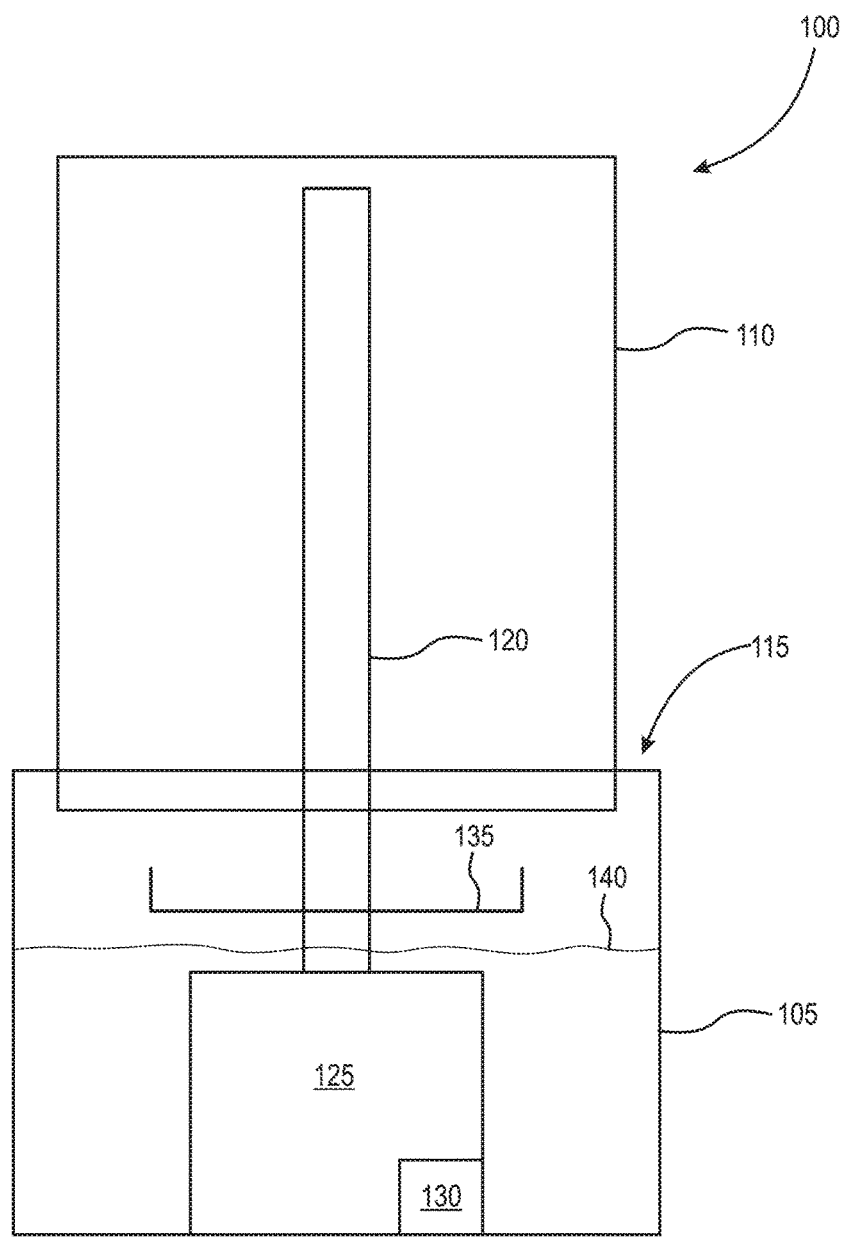
FIG. 1 is a schematic drawing of a fly trap, according to an example embodiment of the present invention.
Figure 3:
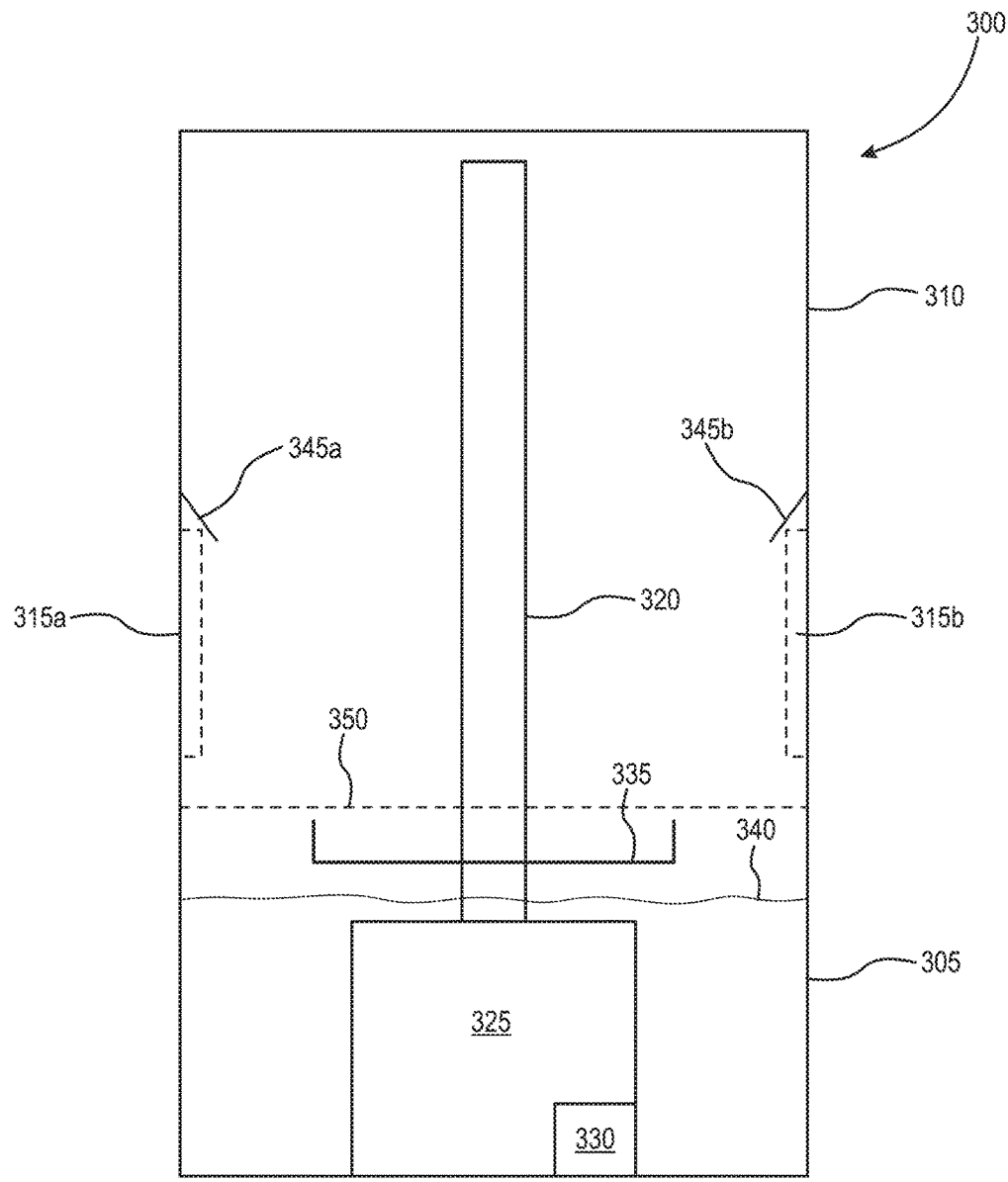
FIG. 3 is a schematic drawing of a fly trap, according to an example embodiment of the present invention.

The fruit flies can enter the trap through slot(s) in the side of the wall that may be shielded so the bait fluid does not exit the trap when flowing down the wall (as illustrated in FIG. 3), or the upper trap body can have a smaller diameter than the lower trap body so the slot/opening can be created between the two pieces (as illustrated in FIG. 1). Slots should be above but close to the bait fluid level and located down from the top, which helps to prevent the fruit flies from finding an exit before being washed away. The low placement of the slot(s) works well because fruit flies tend to fly up into the top of the trap when startled, so such a slot placement provides nowhere for the flies to go but into the streaming bait fluid as it covers the ceiling and walls of the trap. However, the slots could be placed farther up the side of the trap in some embodiments without departing from the scope of the present invention.

FIG. 1 shows an example of a trap 100. The example trap 100 includes a lower trap portion 105 containing a solution 140 and an upper trap portion 110 containing ambient air and including at least one opening 115 to allow for ingress of flies. A conduit 120 extends from the lower trap portion 105 to the upper trap portion 110. A pump 125 is submersed in the solution 140 and coupled to the conduit 120. A timer 130 is configured to intermittently activate the pump 125. When activated, the pump 125 causes the solution 140 to travel up the conduit 120 and to flow along the inner surface of the upper trap portion 110. Any flies that are on the inner surface of the upper trap portion 110 are captured by the flowing solution. An optional bait tray 135 can be included. Additional bait can be placed on the tray 135 and used to supplement the bait solution, or can be used instead of bait solution, in which case, plain water, for example, can be used as the solution.

Figure 2:
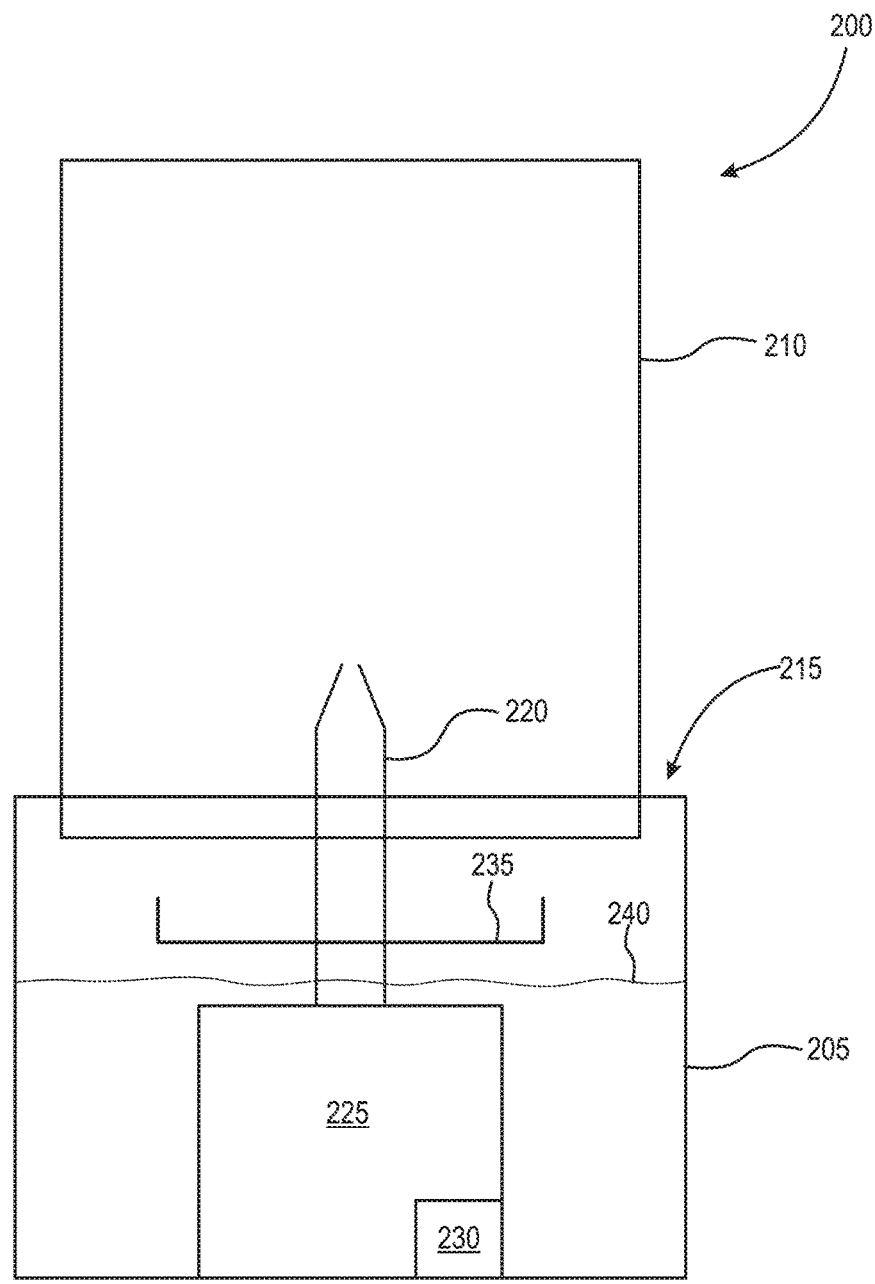
FIG. 2 is a schematic drawing of a fly trap, according to an example embodiment of the present invention.

FIG. 2 shows another example of a trap 200. The trap is similar to that of FIG. 1, but includes a nozzle 220 for spraying the solution from the lower portion of the trap toward to the upper portion, instead of a conduit. The example trap 200 includes a lower trap portion 205 containing a solution 240 and an upper trap portion 210 containing ambient air and including at least one opening 215 to allow for ingress of flies. A pump 225 is submersed in the solution 240 and coupled to a nozzle 220 to spray the solution from the lower portion of the trap toward to the upper portion. A timer 230 is configured to intermittently activate the pump 225. When activated, the pump 225 causes the solution 240 to spray from the nozzle 220 and to flow along the inner surface of the upper trap portion 210. Any flies that are on the inner surface of the upper trap portion 210 are captured by the flowing solution. An optional bait tray 235 can be included. Additional bait can be placed on the tray 235 and used to supplement the bait solution, or can be used instead of bait solution, in which case, plain water, for example, can be used as the solution. The nozzle 220 if FIG. 2 is shown as having a particular shape, but can take many forms without departing from the scope of the present invention FIG. 3 shows another example of a trap 300. The trap 300 is similar to that of FIG. 1, but the opening(s) for flies to enter the trap 300 is provided by slots 315a,b in the wall of the upper trap portion 310. The example trap 300 includes a lower trap portion 305 containing a solution 340 and an upper trap portion 310 containing ambient air and including at least one opening 315a,b to allow for ingress of flies. A conduit 320 extends from the lower trap portion 305 to the upper trap portion 310. A pump 325 is submersed in the solution 340 and coupled to the conduit 320. A timer 330 is configured to intermittently activate the pump 325. When activated, the pump 325 causes the solution 340 to travel up the conduit 320 and to flow along the inner surface of the upper trap portion 310. Any flies that are on the inner surface of the upper trap portion 310 are captured by the flowing solution. Shields 345a,b may be coupled to the inner side of the opening(s) 315a,b to prevent the solution 340 from exiting the at least one opening 315a,b. An optional bait tray 335 can be included. Additional bait can be placed on the tray 335 and used to supplement the bait solution, or can be used instead of bait solution, in which case, plain water, for example, can be used as the solution. The upper trap portion 310 and the lower trap portion 305 can be separate pieces that can be coupled together (e.g., at line 350), or can be part of one component.

Figure 4:
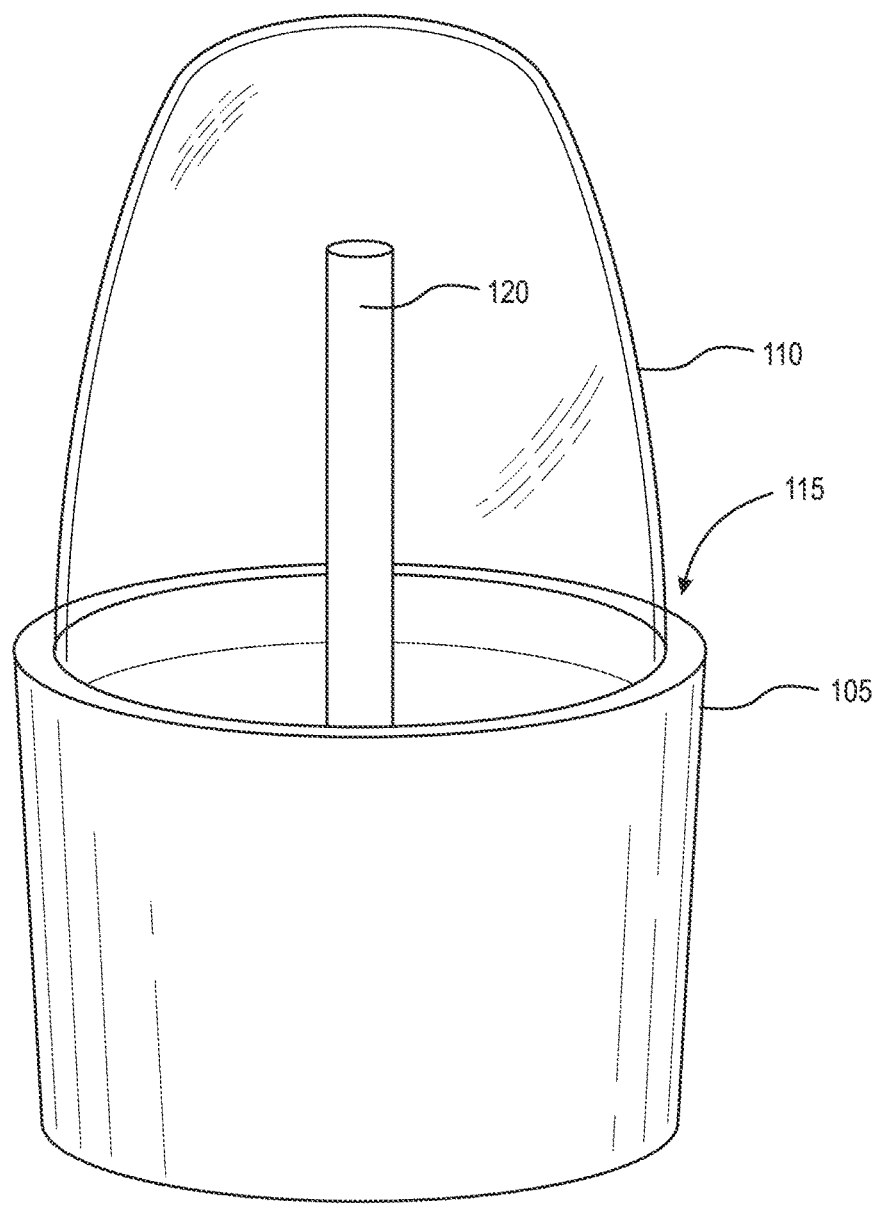
FIG. 4 is a perspective drawing of a fly trap similar to that of FIG. 1, according to an example embodiment of the present invention.

FIG. 4 is a perspective drawing of a fly trap similar to that of FIG. 1, according to an example embodiment of the present invention. FIG. 4 is a front elevation view showing an upper trap portion 110, lower trap portion, one opening 115 to allow for ingress of flies, and conduit 120 extending from the lower trap portion 105 to the upper trap portion 110.

Figure 5:
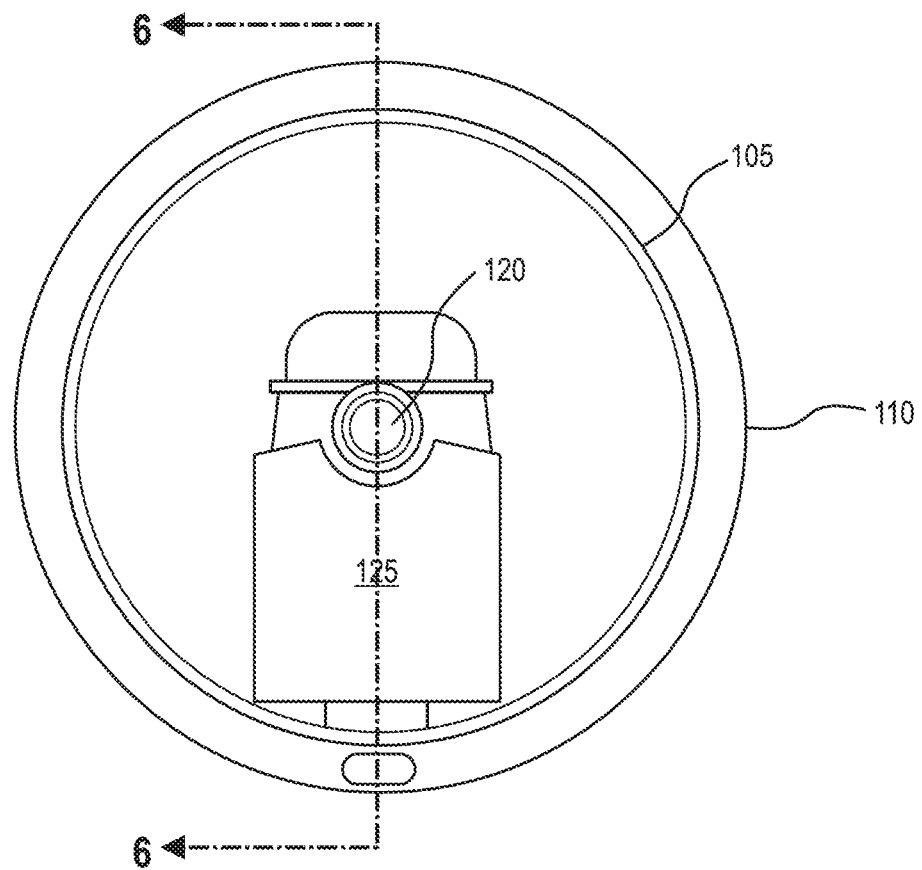
FIG. 5 is a top view drawing of the fly trap of FIG. 4.

FIG. 5 is a top view drawing of the fly trap of FIG. 4. FIG. 5 shows the upper trap portion 110, lower trap portion, conduit 120, and pump 125.

Figure 6:
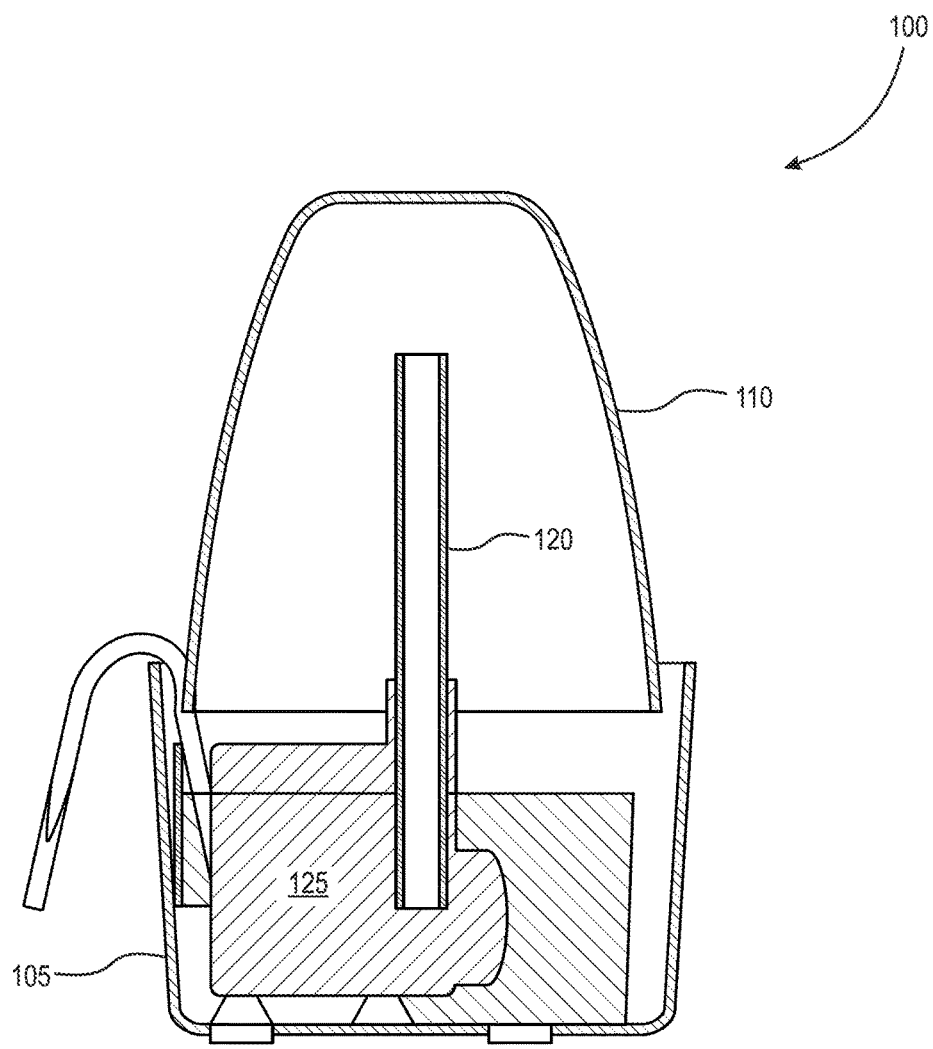
FIG. 6 is a cross sectional drawing of the fly trap of FIG. 4.

FIG. 6 is a cross sectional drawing of the fly trap of FIG. 4. FIG. 6 shows example dimensions of the trap according to one example embodiment.

According to the embodiments illustrated in FIGS. 7-11, the fly traps in their various configurations employ a two-step process to remove unwanted flies from the local environment. The first step is a lure using, for example, a household and non-toxic attractant, such as apple cider vinegar, attracting flies in the local environment to the trap. The second step is an intermittent suction effect used to physically pull the flies from the area around the lure into the trap vessel, completing the removal of pests from the area. The fly trap uses a collection of devices, including a physical trap, a vacuum, and an electronic intermittent timer.

Figure 7:
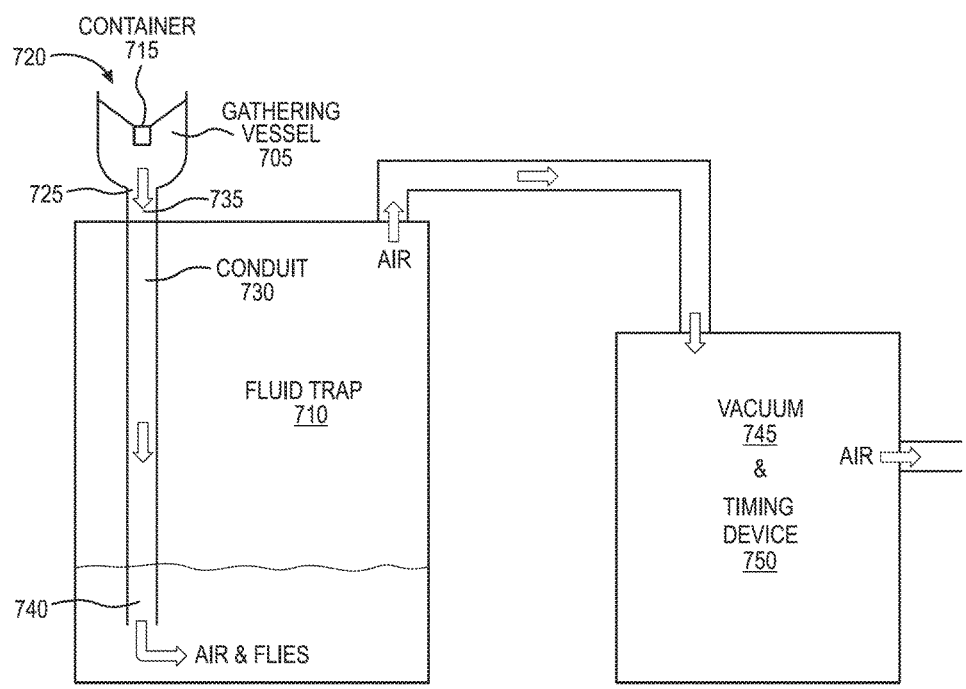
FIG. 7 is a schematic drawing of a fly trap, according to an example embodiment of the present invention.

FIG. 7 is a schematic drawing of a fly trap, according to an example embodiment of the present invention. On the left side of FIG. 7, a physical trap is shown. At the top of the trap is a gathering vessel 705 in the shape of a cylindrical funnel, which contains a lure in a container 715. The gathering vessel 705 has a first opening (e.g., wide-mouth) 720 facing upwards with a small container 715 suspended within, holding the fly attractant. Trusses that support the suspended lure container 715 may also function as surface area for flies to land on around the lure. In the particular embodiment shown, a second opening (e.g., lower tip) 725 of the gathering vessel 705 is inserted into the top of a fluid trap 710 and connects to the top 735 of a conduit (e.g., tube) 730 running down most of the height of the chamber of the fluid trap 710. Water, for example, may be used inside the body of the fluid trap 710 to fill the bottom, submerging the output 740 of the conduit (intake tube) 730 under water. When the vacuum is active the intake tube 730 leads flies from the gathering vessel 705 into the body of the fluid trap 710, the force of which disables and submerges the flies in the fluid trap 710. At the top of the trap, for example, is another tube, leading from inside the chamber of the fluid trap 710 to the outside. This tube connects to a vacuum system 745 that creates negative pressure inside the body of the fluid trap 710, pulling flies from the gathering vessel 705 into the water below. One aspect of the trap's effectiveness is an intermittent timer 750 that controls when the vacuum 745 is active. Activation of the suction on an interval accomplishes several things. Operation is automatic and requires no supervision. The trap is more effective when run on an interval because flies are allowed to collect near the lure without being disturbed, then the vacuum is activated and the trap is active for a short amount of time. Success has been achieved with a 15-minute off/1-minute on interval, for example. The system also saves power because the vacuum is only in operation for one minute, four times an hour, for example; thus, the impact on power cost is minimal.

An example embodiment of the device may function as follows. The interior of the fluid trap 710 can be filled with approximately two inches of water, submerging the output side 740 of the intake tube 730. A drop of dish soap may be added to the water to reduce surface tension of the water and ensure flies are quickly saturated when pulled into the water. The bubbles also help dispatch the flies. The lure of the gathering vessel 705 may be prepared by adding a non-toxic natural attractant, such as vinegar or fruit juice, to the container 715. The vacuum 745 can be attached to an output tube at the top of the fluid trap 710, and be connected to an electronic timer 750, which controls automatic operation of the vacuum 745. The device is placed in an area where flies have become a problem, plugged in (or operated by battery), and left to operate for a time (e.g., overnight), trapping the pests and cleaning the environment. A user may then simply remove a lid of the fluid trap 710, empty the fluid trap 710 into a sink or toilet, and the trap is ready to be cleaned and refilled for re-use, if needed.

Figure 8:
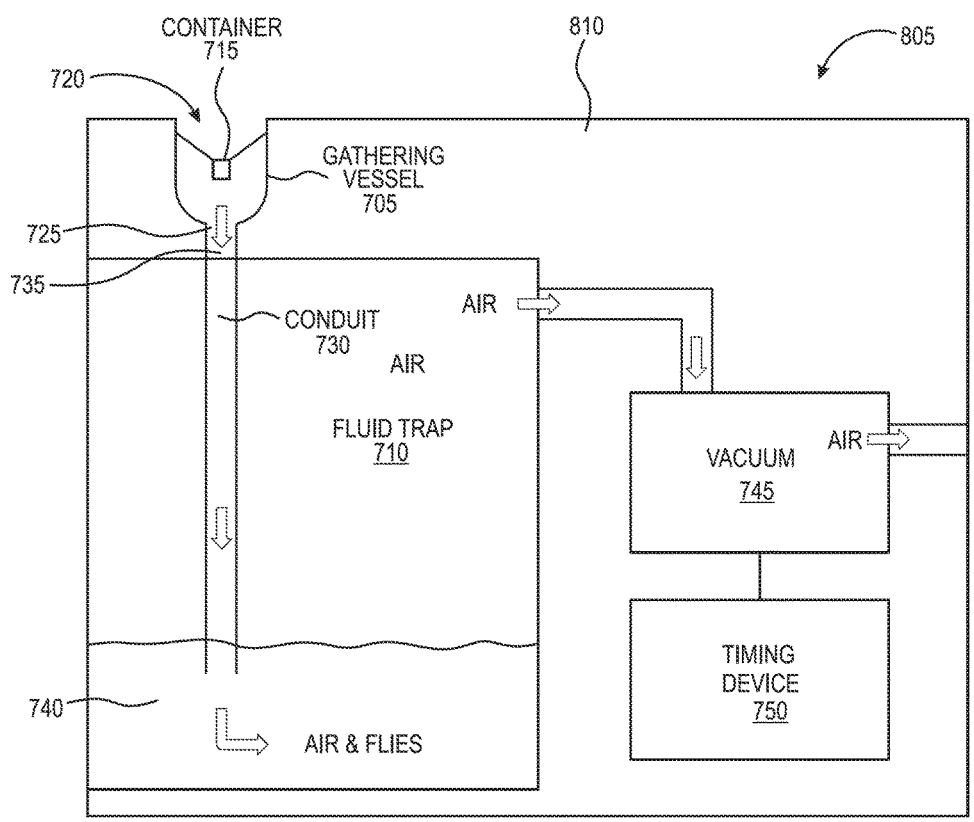
FIG. 8 is a schematic drawing of a fly trap contained within a housing, according to an example embodiment of the present invention.

FIG. 8 is a schematic drawing of a fly trap contained within a housing 810, according to an example embodiment of the present invention. As a manufactured product, the device could be packaged in a self-contained unit 805, as shown in FIG. 8. In FIG. 8, the gathering vessel 705, fluid trap 710, vacuum 745, timing device 750, and related components are all contained within a housing 810. While the gathering vessel 705 is shown as being located inside the housing 810, with the first opening 720 of the gathering vessel 705 being an opening in the housing 810, the gathering vessel 705 can alternatively be attached to the outside of the housing 810, similar to the gathering vessel of FIG. 7. The overall functionality of the trap remains the same, but such a purpose-built version of the trap would allow the device to be employed even during business hours, in public areas. Using a vacuum 745 that is properly scaled in power and quieted with baffles, the device could come in multiple versions appropriate for different environments. A low-power version could be used for home or in social businesses, such as a bar, small restaurants, and grocery stores. In such areas a primary concern would be non-intrusive operation. A higher-power version could be available for commercial kitchens, healthcare facilities, breweries, distilleries, and fruit growing and processing locales, where sound or power usage is less of a concern and airborne pests may be more numerous.

Figure 9:
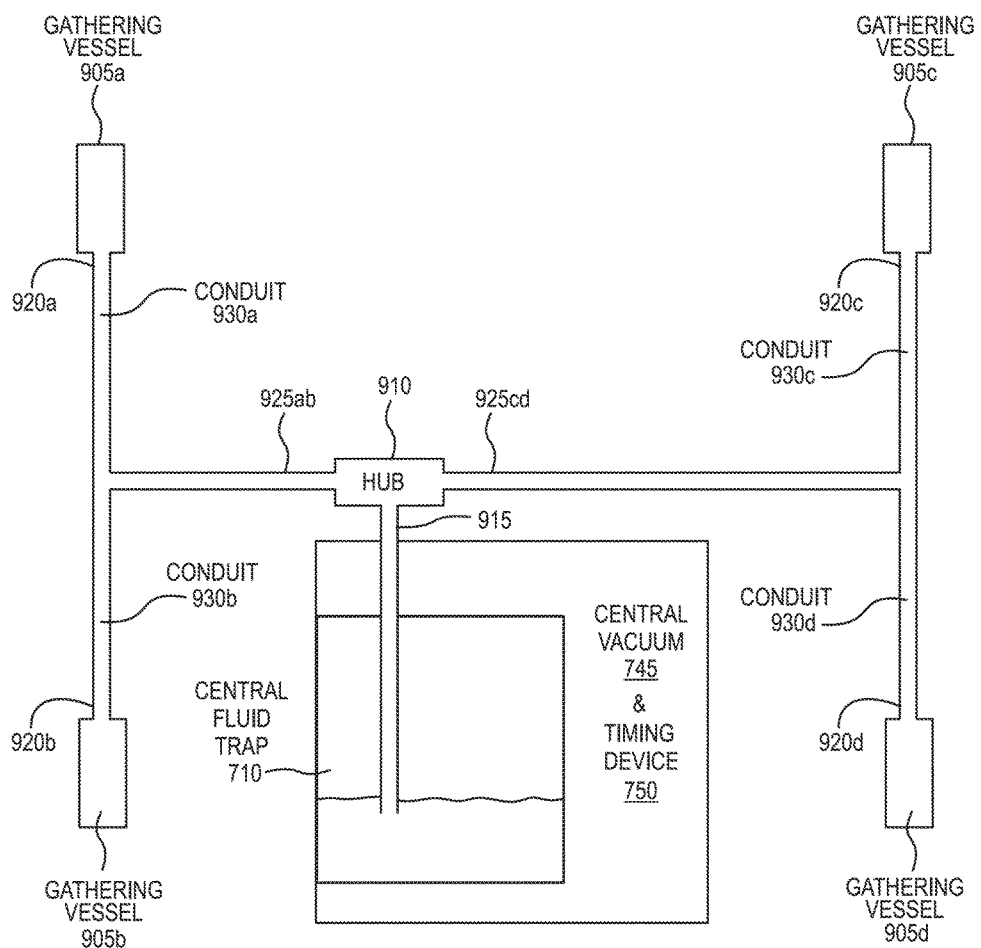
FIG. 9 is a schematic drawing of a fly trap with multiple gathering vessels, according to an example embodiment of the present invention.

FIG. 9 is a schematic drawing of a fly trap with multiple gathering vessels 905a-d, according to an example embodiment of the present invention. A modular system can be employed, with a central vacuum 745 being attached to multiple gathering vessels 905a-d. This could be used at a bar, for example, with the trap out of view (e.g., behind the bar), and small gathering vessels placed near sinks or garnish trays. This configuration could also be used on a much larger scale, such as in an orchard. In such a configuration, the trap includes a central fluid trap 710, multiple gathering vessels 905a-d, multiple conduits 930a-d, a central vacuum 745, and a timing device 750. The multiple conduits 930a-d each have a first end 920a-d coupled to a corresponding gathering vessel 905a-d, and a second end 925a-d coupled to a common conduit 915 to be submerged within fluid inside the central fluid trap 710. As shown in FIG. 9, a hub 910 may be used to couple the multiple conduits 930a-d to the common conduit 915. The hub 910 may also include a switch (not shown) that activates and deactivates various conduits, and that can cycle through the multiple conduits, activating a subset of the conduits at a given time and allowing the device to use a lower-power vacuum but still handle multiple trap locations.

Figure 10:
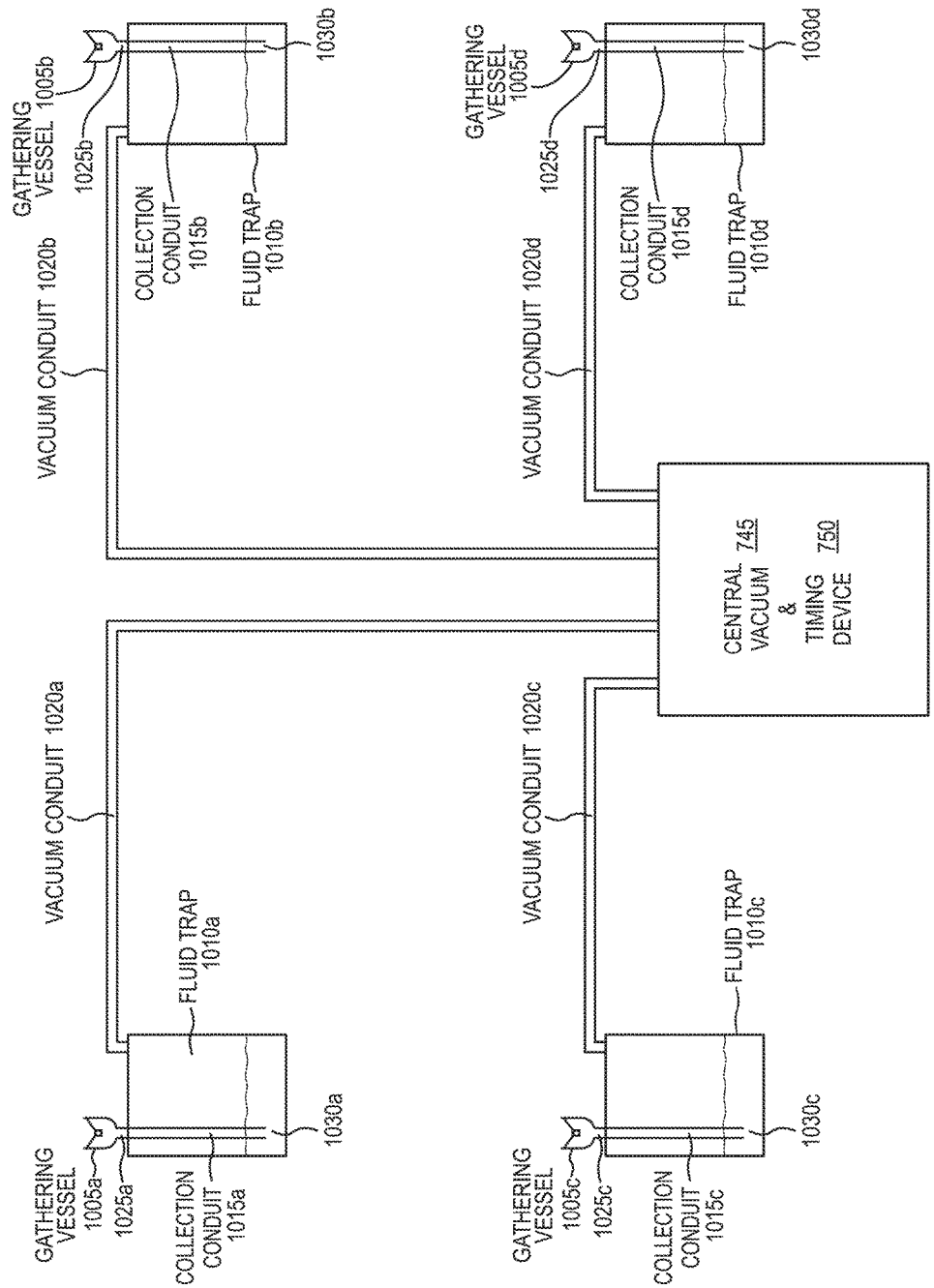
FIG. 10 is a schematic drawing of a fly trap with multiple gathering vessels and fluid traps, according to an example embodiment of the present invention.

FIG. 10 is a schematic drawing of a fly trap with multiple gathering vessels 1005a-d and fluid traps 1010a-d, according to an example embodiment of the present invention. A modular system can be employed, with a central vacuum 745 being attached to multiple gathering vessels 1005a-d and multiple fluid traps 1010a-d. In such a configuration, the trap includes multiple gathering vessels 1005a-d, multiple fluid traps 1010a-d, multiple conduits 1015a-d, a central vacuum 745, and a timing device 750. The multiple conduits 1015a-d each have a first end 1025a-d coupled to a corresponding gathering vessel 1005a-d, and a second end 1030a-d to be submerged within fluid inside a corresponding fluid trap 1010a-d. Each of the fluid traps 1010a-d is coupled to the vacuum 745 of the system by a corresponding vacuum conduit 1020a-d.

Figure 11:
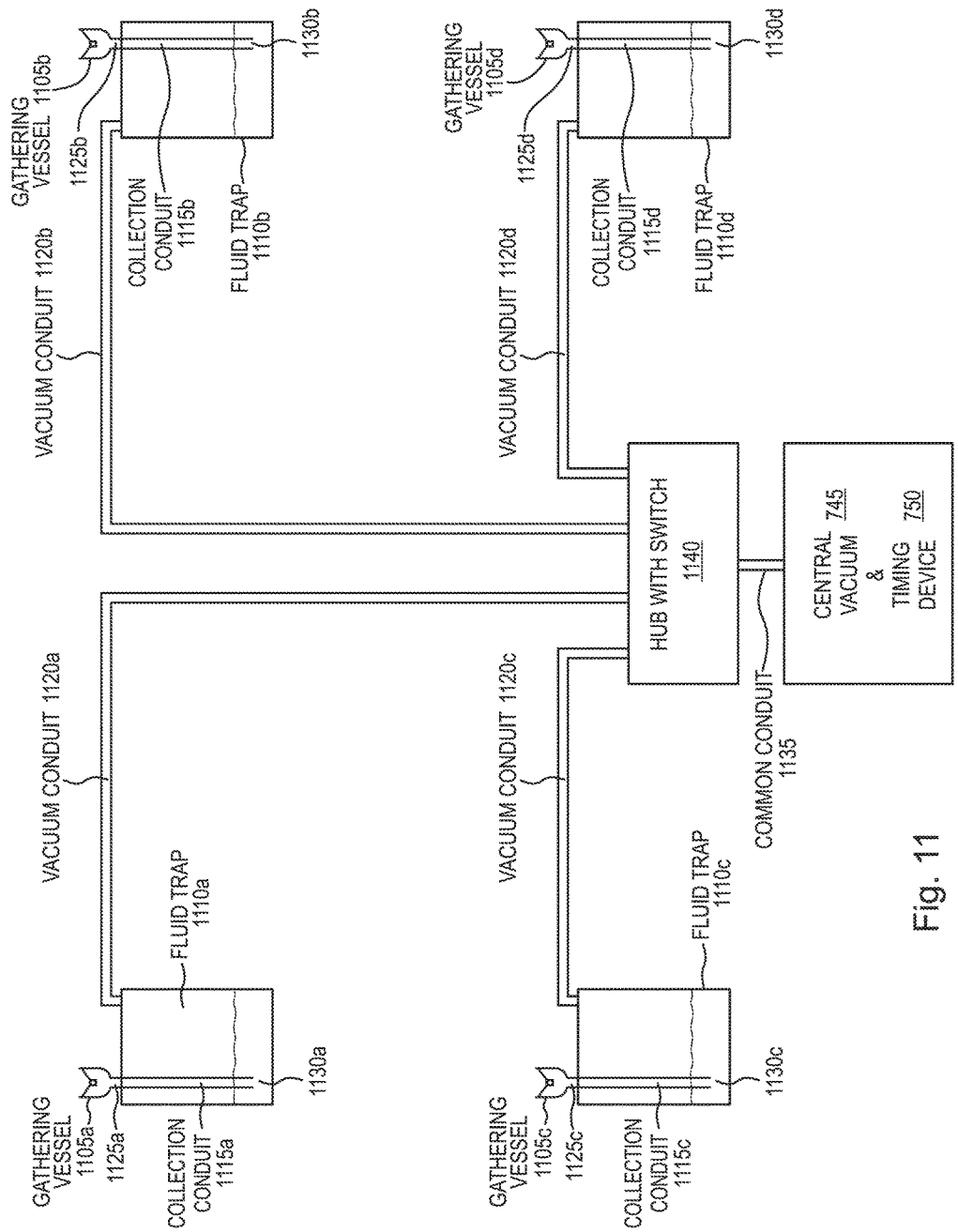
FIG. 11 is a schematic drawing of a fly trap with multiple gathering vessels and fluid traps, according to an example embodiment of the present invention.

FIG. 11 is a schematic drawing of a fly trap with multiple gathering vessels 1105a-d and fluid traps 1110a-d, according to an example embodiment of the present invention. The trap system of FIG. 11 is similar to the system of FIG. 10, except that the vacuum conduits 1120a-d are coupled to the vacuum 745 using a hub 1140 and common conduit 1135. The hub 1140 of the particular embodiment also includes a switch that activates and deactivates various vacuum conduits 1120*a-d*. The switch may also cycle through the multiple vacuum conduits 1120*a-d*, activating a subset of the vacuum conduits 1120*a-d* at any one time, allowing the system to use a lower-power vacuum 745 but still handle multiple trap locations.

Figure 12:
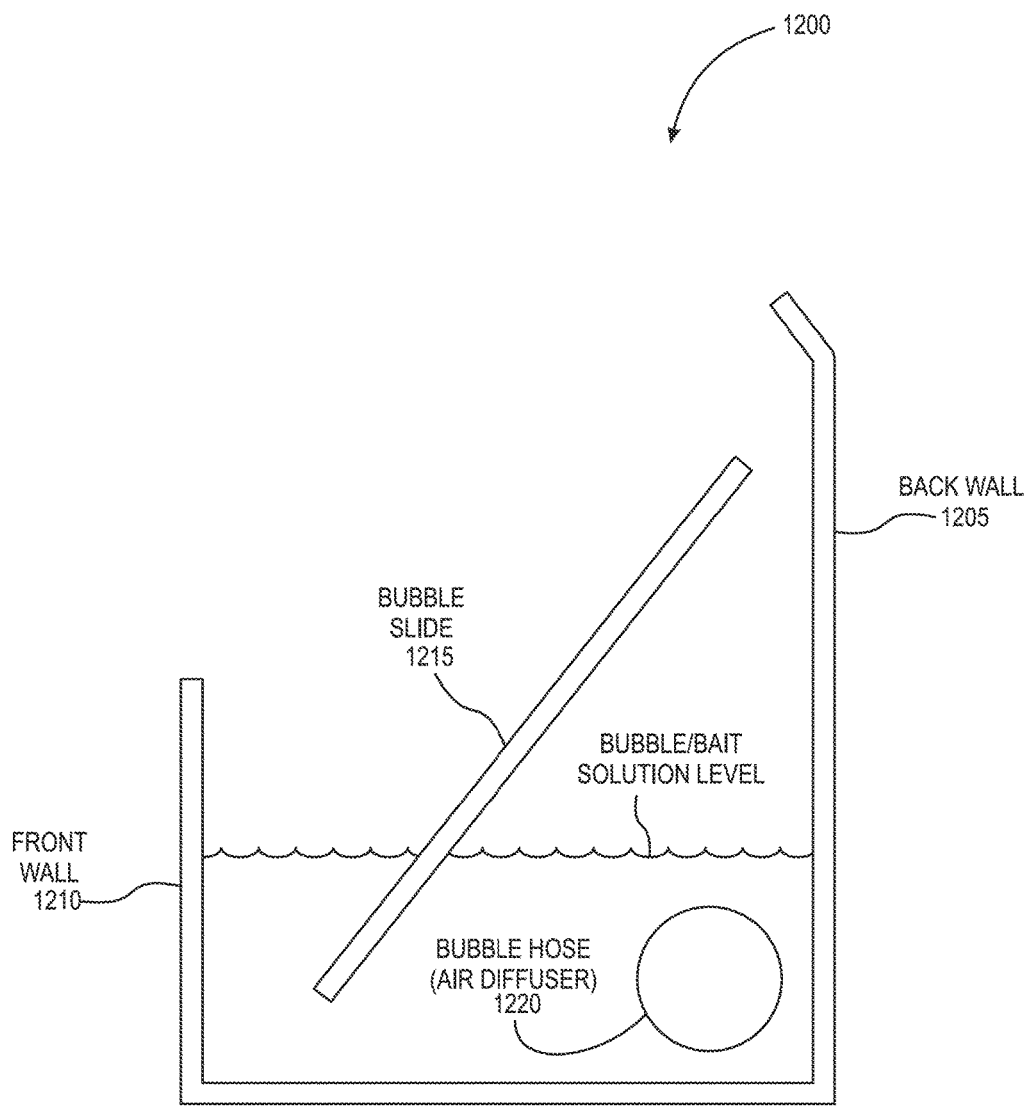
FIG. 12 is a schematic drawing of a fly trap, according to an example embodiment of the present invention.
Figure 13:
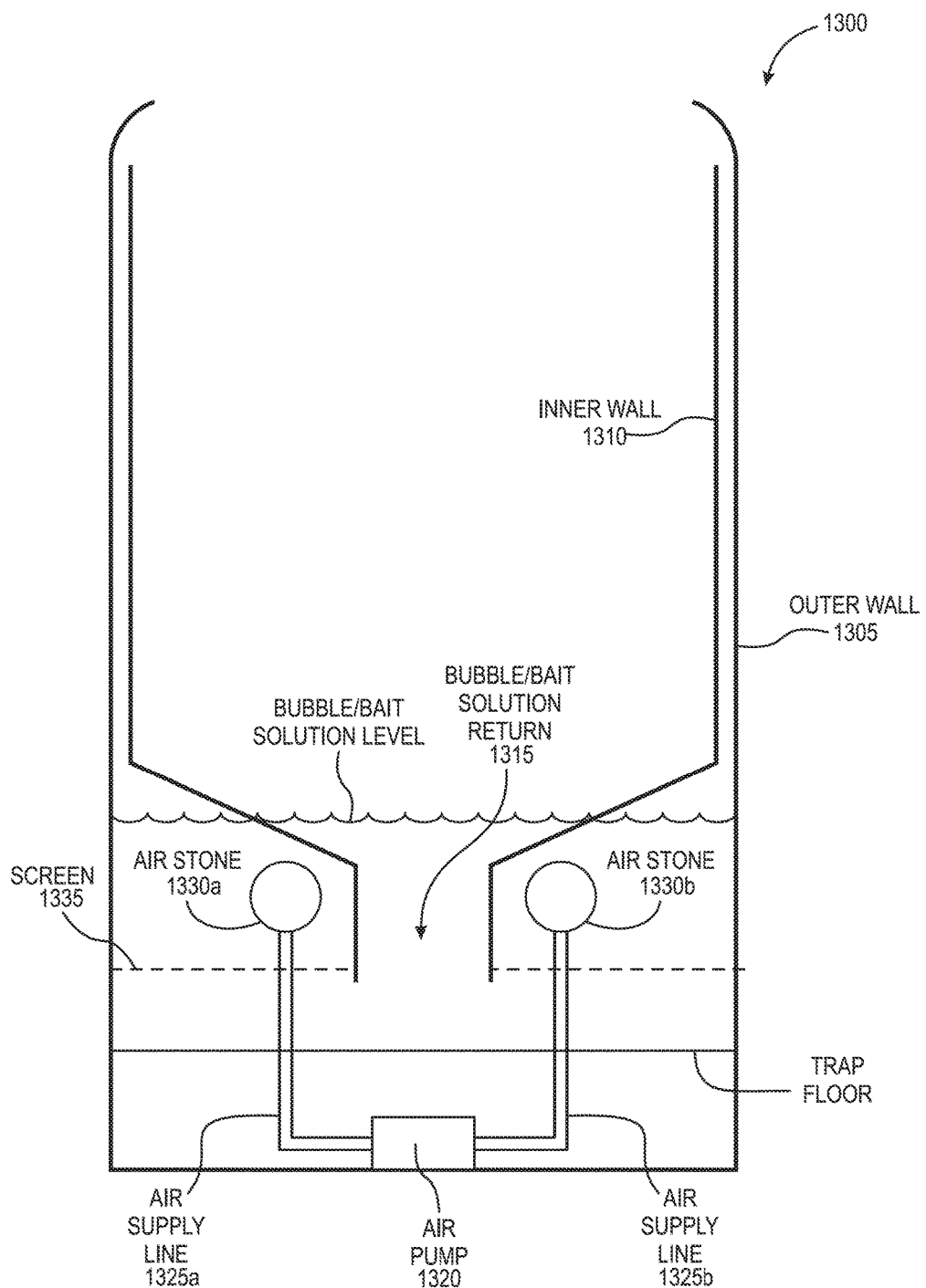
FIG. 13 is a schematic drawing of a fly trap, according to an example embodiment of the present invention.

According to the embodiments illustrated in FIGS. 12-16, fly traps can operate by creating a cascading wall of bubbles that flies (e.g., fruit flies) appear to view as a solid surface, and when the flies attempt to land on the cascading wall of bubbles, the bubbles pop and secure the flies. The wall of bubbles continues to slide down into the trap (e.g., down a slanted wall 1215 of a flat trap 1200 as shown in FIG. 12, or down the inside 1310 of a round (or rectangular, or other enclosed shaped) trap 1300 as shown in FIG. 13, for example) until the secured flies and remaining bubbles reach the bait/bubble solution. The bait/bubble solution continually circulates creating a moving body of bubbles (e.g., like a conveyer belt, for example), which returns back to the original location and becomes liquid again to make more bubbles. As flies land on the moving body of bubbles, the bubbles pop, entrapping the flies in the moving body of bubbles, which continues back to the bubble/bait reservoir where the flies drown and are collected until the trap is rinsed.

FIG. 12 shows an example of a "flat trap" 1200. In the flat trap example, the bubbles are created between a bubble slide (slanted/angled surface) 1215 and a back wall 1205 and rise in the space between the bubble slide 1215 and the back wall 1205. At the top, a lip of the back wall 1205 directs the bubbles over the slide 1215, which then cascade down the slide 1215, where at the bottom of the slide the bubbles pop and join the rest of the bubble/bait solution to continue the cycle. The bubbles are created using an air pump (not shown) and hose/conduit to transfer the air and an air diffuser, such as an air stone, 1220.

Figure 14:
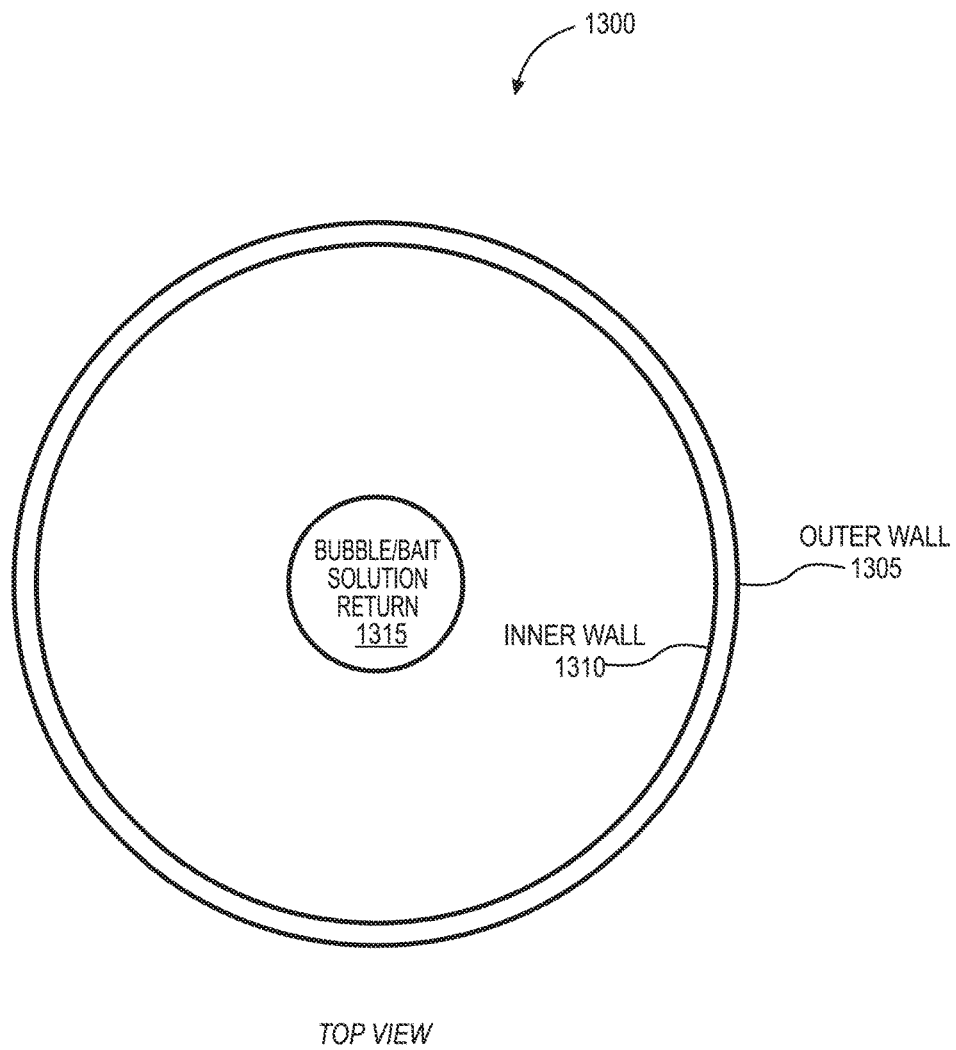
FIG. 14 is a schematic drawing of the fly trap of FIG. 13 viewed from the top.

FIG. 13 shows an example of a "round trap" 1300. In the round trap example, the bubbles are created and rise between an outer wall 1305 and inner wall 1310. The bubbles follow the space between the outer wall 1305 and inner wall 1310 to the top, where a bent lip of the outer wall 1305 directs the bubbles into the center, where the bubbles cascade down within the inner wall 1310, where at the bottom, the bubbles join the rest of the bubble/bait solution in a solution return 1315. The example trap 1300 also includes an air pump 1320, one or more air supply conduits 1325*a,b*, and air stones 1330*a,b*. The example trap 1300 also includes a screen 1335 to retain any captured flies below the screen 1335. The screen 1335 includes a hole in its center through which the inner wall 1310 extends to create the solution return 1315. FIG. 14 shows the "round trap" of FIG. 13 from a top view.

In both the flat and round examples, as the flies land on the cascading wall of bubbles, the bubbles pop, entrapping the flies in the cascading bubble wall, which continues back to the bubble/bait reservoir, where the fruit flies drown and are collected until the trap is rinsed. The example traps may include three components: a bait/bubble solution, an air pump scaled to the size of the trap and connected to an air stone or other device for bubble formation, and a collection area. Use of an air stone, in one example, creates many small bubbles that are directed in a manner that creates a wall of bubbles available for the flies to land on, which returns to the collection area depositing the flies. The air pump may be scaled to the size of the trap in order to provide a sufficient volume of air to the air stones or bubble hoses for proper bubble formation. The bait/bubble solution may contain an attractant to draw flies to the trap. Additional ingredients may be added to the bubble bait solution to create bubbles that last long enough to create the bubble wall but then will pop easily when the flies land on the bubbles and when the bubbles rejoin the remaining solution. One example solution may include water, apple cider vinegar, and a drop of dish soap.

The flat trap example can be made in specific sizes or can be manufactured in a modular/cut-to-fit manner enabling an installer to install a trap along the whole length of a wall, for example, in locations with large fruit fly problems. The flat trap example can also include a drain valve, allowing easy cleaning if mounted on a wall. The round trap example can fit nicely among liquor bottles on a shelf of a bar or restaurant, or on a countertop in a residence. The round trap example may be made in two parts, such that the inner structure slides out for easy cleaning. Both design examples can incorporate light as an attractant by making the outer walls opaque, and the bubble slide and/or inner walls translucent, and adding a light source. This illuminates the bubble wall to add to its attractant nature. Both design examples can include additional features designed to aid in popping the bubbles where the cascading bubble wall joins the rest of the solution. Such additional features may include additional structures, moving parts, or spraying water.

Figure 15:
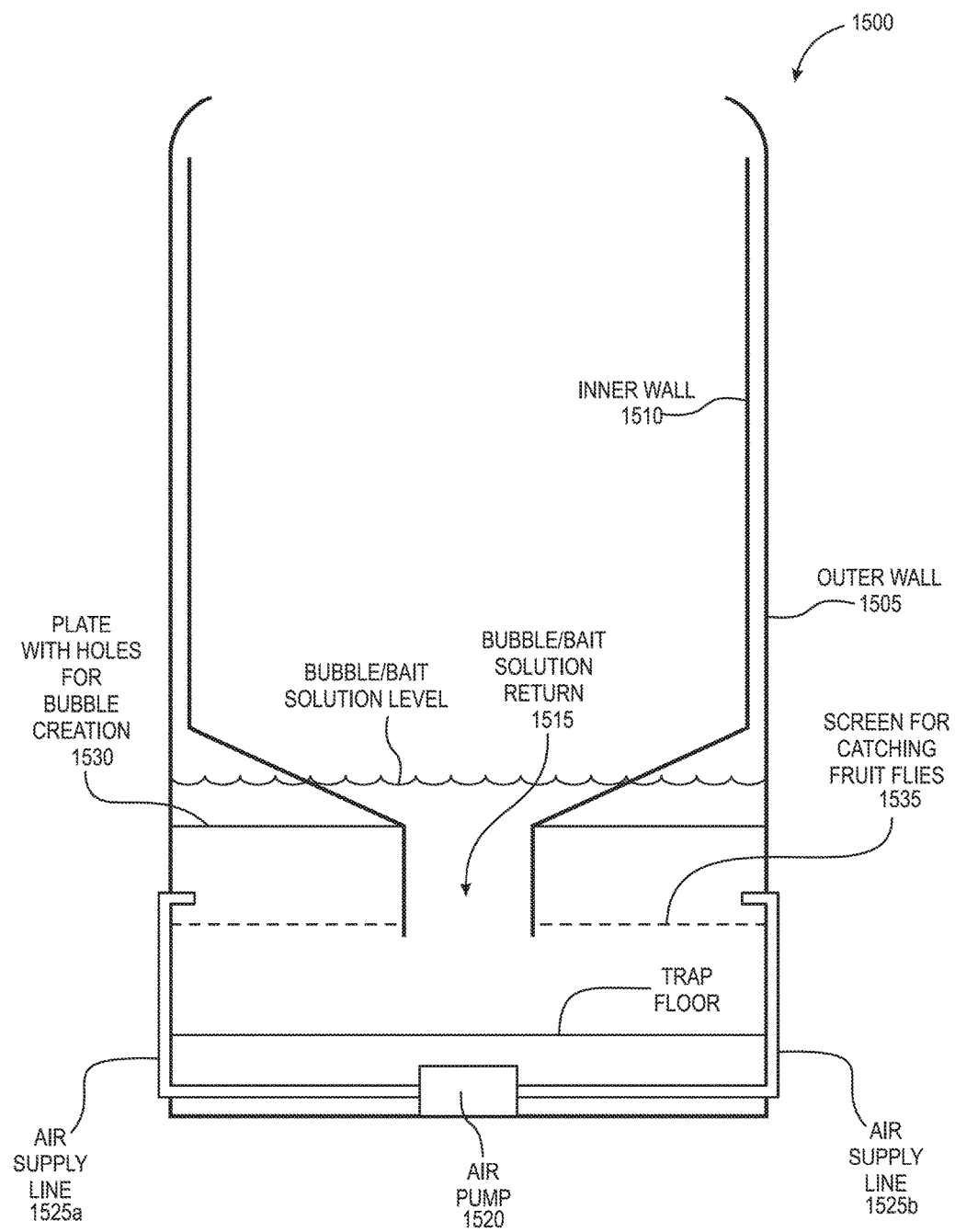
FIG. 15 is a schematic drawing of a fly trap, according to an example embodiment of the present invention.

FIG. 15 is a schematic drawing of a fly trap 1500, according to another example embodiment of the present invention. The example trap 1500 includes an outer wall 1505 containing a solution, an inner wall 1510 extending into the solution, and a space formed between the outer wall 1505 and the inner wall 1510. The example trap 1500 also includes an air pump 1520 and one or more air supply conduits 1525*a,b* that supply air from the air pump 1520 to the solution. As in the above examples, the air forms bubbles in the solution that rise in the space formed between the outer wall 1505 and the inner wall 1510 and that cascade downward within the inner wall 1505 and into the solution at the solution return 1515. The trap 1500 also includes a plate 1530 having holes through which the air from the air supply conduits 1525*a,b* moves and becomes multiple bubbles. The plate 1535 aides in the creation of multiple evenly distributed bubbles. The example trap 1500 also includes a screen 1535 for retaining any captured flies below the screen 1535. The screen 1535 includes a hole in its center through which the inner wall 1510 extends to create the solution return 1515.

Figure 16:
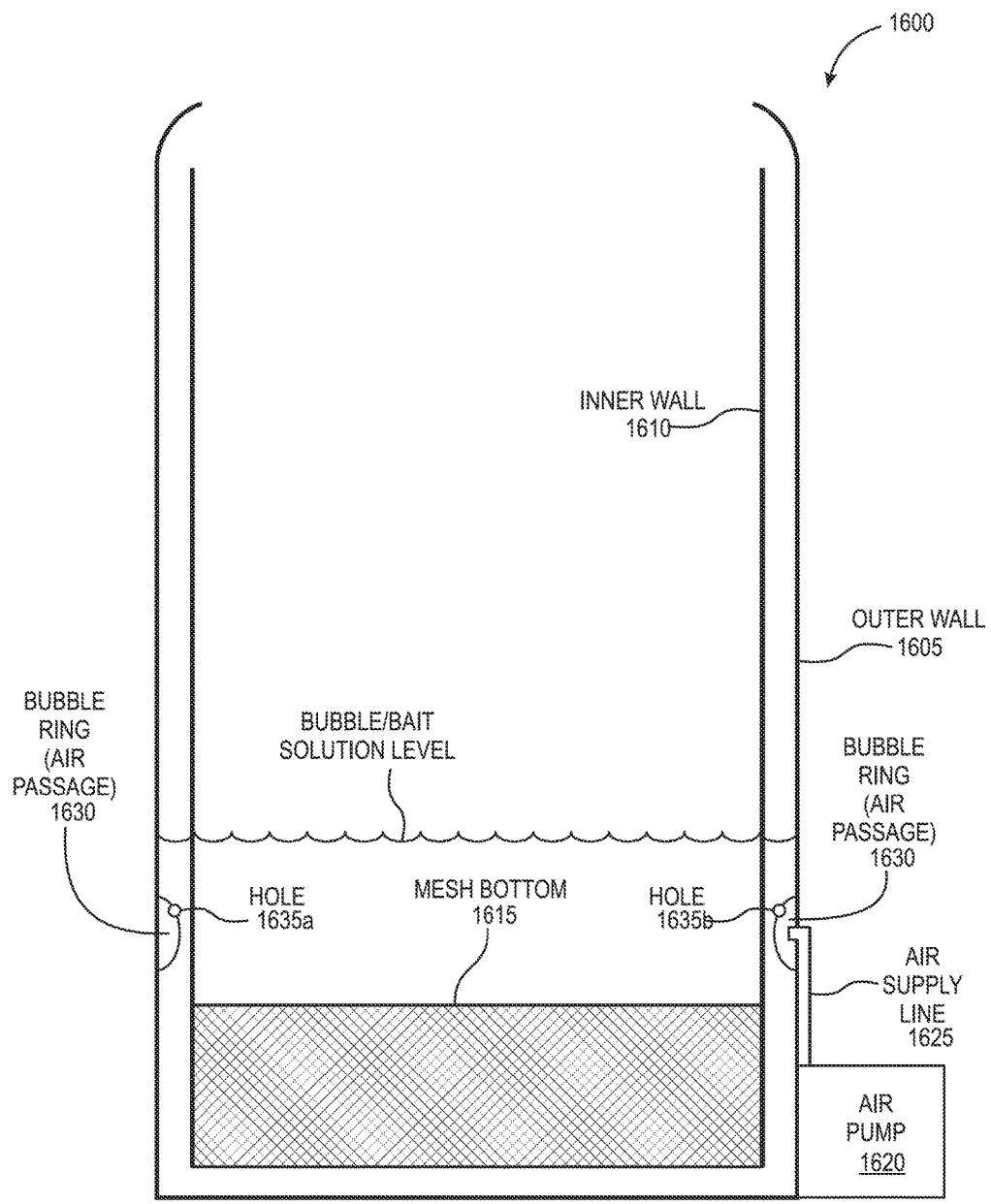
FIG. 16 is a schematic drawing of a fly trap, according to an example embodiment of the present invention.

FIG. 16 is a schematic drawing of a fly trap 1600, according to another example embodiment of the present invention. The example trap 1600 includes an outer wall 1605 containing a solution, an inner wall 1610 extending into the solution, and a space formed between the outer wall 1605 and the inner wall 1610. The example trap 1600 also includes an air pump 1620 and an air supply conduit 1625 that supplies air from the air pump 1620 to the solution. As in the above examples, the air forms bubbles in the solution that rise in the space formed between the outer wall 1605 and the inner wall 1610 and that cascade downward within the inner wall 1605 and into the solution at the solution. The trap 1600 also includes a bubble ring (an air passage) 1630 having holes through which the air from the air supply conduit 1625 exits the bubble ring 1630 and becomes multiple bubbles. The bubble ring 1630 aides in the creation of multiple evenly distributed bubbles. The example trap 1600 also includes a mesh layer 1615 that can retain any captured flies at the bottom of the trap 1600.

While the invention has been particularly shown and described with references to example embodiments thereof, it will be understood by those skilled in the art that various changes in form and details may be made therein without departing from the scope of the invention encompassed by the appended claims. For example, traps can take different shapes than disclosed herein, but operate in a similar fashion as described above. Variations in bait solution can allow the trap to be effective on flying pests besides fruit flies, including mosquitoes and bees, for example. Programmable timers may be used, allowing a user to customize the operating intervals to better suit particular needs. In embodiments using a gathering vessel, there may be many variations in the size and shape of the gathering vessel. For example, the width and depth of the vessel can vary, platforms can be added for flies to land on or near the bait, or multiple partitions may be used for multiple bait types. Various aerodynamic shapes of the funnel, lure container, and suspension trusses can increase effectiveness at a given power level. In embodiments using air supply conduits, one or two air supply conduits have been shown in the above examples, but any number of air supply conduits may be used.

What is claimed is:

1. A fly trap, comprising:
a lower trap portion configured to contain a solution;
an upper trap portion containing ambient air, the upper trap portion including a downward concavity, including an inner surface on an enclosed side of the upper trap portion, and including at least one opening to allow for ingress of flies;
a conduit extending from the lower trap portion to the upper trap portion, the conduit extending upward within the downward concavity and spaced from the top of the upper trap portion;
a pump configured to be submersed in the solution, coupled to the conduit, and when activated, cause the solution to travel up the conduit, project up from the conduit towards the inner surface of the upper trap portion through the space between the conduit and the upper trap portion, contact the inner surface of the upper trap portion, and flow along the inner surface of the upper trap portion to capture the flies, the solution contacting the inner surface as it flows along the inner surface; and
a timer configured to intermittently activate the pump.

2. A fly trap as in claim 1 further comprising at least one shield coupled to the inner side of the at least one opening to prevent the solution from exiting the at least one opening.

3. A fly trap as in claim 1 further comprising a tray configured to be suspended above the solution for retaining fly bait.

4. A fly trap as in claim 1 further comprising a screen configured to be submersed in the solution and above the pump to retain captured flies above the screen.

5. A fly trap as in claim 1 wherein a diameter of the upper trap portion is smaller than a diameter of the lower trap portion, creating the at least one opening between the lower trap portion and the upper trap portion.

6. A fly trap as in claim 1 wherein the upper trap portion and the lower trap portion are separate pieces that are configured to be coupled together.

7. A fly trap as in claim 1 wherein the upper trap portion and the lower trap portion are part of one unitary component.

8. A fly trap as in claim 1 wherein the fly trap is cylindrically shaped.

9. A fly trap, comprising:
a housing configured to contain a solution, the housing including a downward concavity, including an inner surface on an enclosed side of the housing, and including at least one opening to allow for ingress of flies;
a conduit arranged substantially vertically in the housing, the conduit extending upward within the downward concavity and spaced from the top of the housing;
a pump configured to be submersed in the solution, coupled to the conduit, and, when activated, cause the solution to travel up the conduit, project up from the conduit towards the inner surface of the housing through the space between the conduit and the housing, contact the inner surface of the housing, and flow along the inner surface of the housing to capture the flies, the solution contacting the inner surface as it flows along the inner surface; and
a timer configured to intermittently activate the pump.

10. A fly trap as in claim 9 wherein the at least one opening is a substantially vertical slot formed in the side of the housing.

11. A fly trap as in claim 9 further comprising at least one shield coupled to the inner side of the at least one opening to prevent the solution from exiting the at least one opening.

12. A fly trap as in claim 9 further comprising a tray configured to be suspended above the solution for retaining fly bait.

13. A fly trap as in claim 9 further comprising a screen configured to be submersed in the solution and above the pump to retain captured flies above the screen.

14. A fly trap as in claim 9 wherein the fly trap is cylindrically shaped.

15. A fly trap, comprising:
a housing configured to contain a solution, the housing including a downward concavity, including an inner surface on an enclosed side of the housing, and including at least one opening to allow for ingress of flies;
a nozzle located inside the enclosed side of the housing, spaced from the top of the housing, and configured to spray the solution toward the top of the trap;
a pump configured to be submersed in the solution, coupled to the nozzle, and, when activated, cause the solution to spray from the nozzle toward the top of the trap through the space between the nozzle and the housing, to contact the inner surface of the housing, and to flow along the inner surface of housing to capture the flies, the solution contacting the inner surface as it flows along the inner surface; and
a timer configured to intermittently activate the pump.

16. A fly trap as in claim 15 wherein the at least one opening is a substantially vertical slot formed in the side of the housing.

17. A fly trap as in claim 15 further comprising at least one shield coupled to the inner side of the at least one opening to prevent the solution from exiting the at least one opening.

18. A fly trap as in claim 15 further comprising a tray configured to be suspended above the solution for retaining fly bait.

19. A fly trap as in claim 15 further comprising a screen configured to be submersed in the solution and above the pump to retain captured flies above the screen.

20. A fly trap as in claim 15 wherein the fly trap is cylindrically shaped.

* * * * *